US010650379B2

(12) United States Patent
Agrawal et al.

(10) Patent No.: US 10,650,379 B2
(45) Date of Patent: May 12, 2020

(54) METHOD AND SYSTEM FOR VALIDATING PERSONALIZED ACCOUNT IDENTIFIERS USING BIOMETRIC AUTHENTICATION AND SELF-LEARNING ALGORITHMS

(71) Applicant: Tata Consultancy Services Limited, Mumbai (IN)

(72) Inventors: Sachin Kumar Agrawal, Bangalore (IN); Shalin Garg, Bangalore (IN); Sathish Vallat, Bangalore (IN)

(73) Assignee: Tata Consultancy Services Limited, Mumbai (IN)

( * ) Notice: Subject to any disclaimer, the term of this patent is extended or adjusted under 35 U.S.C. 154(b) by 1027 days.

(21) Appl. No.: 13/925,307

(22) Filed: Jun. 24, 2013

(65) Prior Publication Data

US 2014/0297528 A1 Oct. 2, 2014

(30) Foreign Application Priority Data

Mar. 26, 2013 (IN) .......................... 1148/MUM/2013

(51) Int. Cl.
*G06Q 20/40* (2012.01)
*G06F 21/32* (2013.01)
*G10L 17/24* (2013.01)

(52) U.S. Cl.
CPC ....... *G06Q 20/40145* (2013.01); *G06F 21/32* (2013.01); *G10L 17/24* (2013.01)

(58) Field of Classification Search
CPC .......... G06F 21/32; G06F 21/34; G06F 21/42; H04L 63/0861; H04L 9/3231;

(Continued)

(56) References Cited

U.S. PATENT DOCUMENTS 5,764,789 A * 6/1998 Pare, Jr. ........... G06Q 20/40145
382/115
5,802,199 A * 9/1998 Pare, Jr. ................ G06F 21/554
382/115

(Continued)

OTHER PUBLICATIONS

"Spoken Handwriting for User Authentication using Joint Modelling Systems", Andreas Humm, Rolf Ingold, Jean Hennebert, 2009 (Year: 2009).*

(Continued)

*Primary Examiner* — Patrick McAtee
*Assistant Examiner* — Edgar R Martinez-Hernandez
(74) *Attorney, Agent, or Firm* — Finnegan, Henderson, Farabow, Garrett & Dunner LLP

(57) ABSTRACT

Disclosed is a system and method for biometric authentication of a user using a personalised identification and associated biometric data. In one embodiment, a plurality of personalised identifiers and biometric data may be captured from a number of users and stored in a repository as stored records. The authentication process may be divided into two phases. In the first phase, either a speech recognition or character recognition process may be applied in order to determine the text spoken or written by the user. Subsequently a few records may be fetched from the repository on the basis of text mapping. In the second phase, biometric authentication may be performed by comparing the biometric sample with the stored biometric data corresponding to the fetched records to uniquely identify a single user. Further a machine learning technique may be applied in order to periodically refine a plurality of models stored in the repository.

15 Claims, 8 Drawing Sheets

(58) Field of Classification Search
CPC ............. H04L 9/3271; H04L 2463/082; H04L 2209/56; H04L 9/3226; G10L 17/00; G10L 17/24; G10L 17/04; G10L 17/06; G06Q 20/3821; G06Q 20/4014; G06Q 20/40145; G06Q 20/4016; H04M 2201/41
See application file for complete search history.

(56) References Cited

U.S. PATENT DOCUMENTS

| | | | | |
|---|---|---|---|---|
| 6,044,375 | A * | 3/2000 | Shmueli | G06F 16/355 |
| 6,490,560 | B1 * | 12/2002 | Ramaswamy | G10L 17/10 |
| | | | | 704/231 |
| 7,386,448 | B1 * | 6/2008 | Poss | G10L 17/24 |
| | | | | 379/188 |
| 7,941,380 | B2 * | 5/2011 | Tattan | G06F 21/32 |
| | | | | 380/277 |
| 8,458,465 | B1 * | 6/2013 | Stern | G06F 21/32 |
| | | | | 713/166 |
| 8,536,976 | B2 * | 9/2013 | Headley | G06F 21/34 |
| | | | | 340/5.2 |
| 8,694,315 | B1 * | 4/2014 | Sheets | G06Q 20/40145 |
| | | | | 704/246 |
| 2003/0163739 | A1 * | 8/2003 | Armington | G06F 21/32 |
| | | | | 726/3 |
| 2004/0243567 | A1 * | 12/2004 | Levy | G06F 21/10 |
| 2006/0088194 | A1 * | 4/2006 | Lee | G06K 9/00154 |
| | | | | 382/119 |
| 2008/0147441 | A1 * | 6/2008 | Kil | G06Q 40/08 |
| | | | | 705/2 |
| 2009/0248789 | A1 * | 10/2009 | Fong | H04L 63/0807 |
| | | | | 709/202 |
| 2009/0276355 | A1 * | 11/2009 | Willmore | G06Q 20/102 |
| | | | | 705/40 |
| 2009/0327883 | A1 * | 12/2009 | Robertson | G06F 16/44 |
| | | | | 715/273 |
| 2010/0131279 | A1 * | 5/2010 | Pilz | G06F 21/32 |
| | | | | 704/273 |
| 2010/0228692 | A1 * | 9/2010 | Guralnik | G06K 9/6293 |
| | | | | 706/12 |
| 2011/0047605 | A1 * | 2/2011 | Sontag | G06F 21/32 |
| | | | | 726/7 |
| 2011/0224979 | A1 * | 9/2011 | Raux | G10L 15/07 |
| | | | | 704/233 |
| 2011/0224986 | A1 * | 9/2011 | Summerfield | G10L 17/12 |
| | | | | 704/246 |
| 2011/0302645 | A1 * | 12/2011 | Headley | H04L 9/3215 |
| | | | | 726/7 |
| 2012/0095763 | A1 * | 4/2012 | Kuppuswamy | G06F 21/32 |
| | | | | 704/246 |
| 2013/0263238 | A1 * | 10/2013 | Bidare | G07C 9/257 |
| | | | | 726/7 |
| 2015/0067822 | A1 * | 3/2015 | Randall | G10L 17/04 |
| | | | | 726/17 |

OTHER PUBLICATIONS

"Combined Handwriting and Speech Modalities for User Authentication", Andreas Humm, Rolf Ingold, Jean Hennebert, 2009 (Year: 2009).*

Azeta A. A., et al., "Development and Deployment of VoiceXML-Based Banking Applications," Journal of Computer Science and Its Application, No. 15(1), pp. 59-72 (2008).

Credit Union Tech-Talk, "Biometric Digest Highlights," https://www.cunews.com/november-9-2009.html (Nov. 9, 2009).

Bruce Schneier, "Voice Authentication in Telephone Banking," http://www.schneier.com/blog/archives/2006/07/voice_authentic.html (Jul. 21, 2006).

Uniphore's Voice, "How Speech Recognition Works", http://uniphore.com/blog/2012/08/how-speech-recognition-works/ (Aug. 8, 2012).

* cited by examiner

METHOD AND SYSTEM FOR VALIDATING PERSONALIZED ACCOUNT IDENTIFIERS USING BIOMETRIC AUTHENTICATION AND SELF-LEARNING ALGORITHMS

PRIORITY CLAIM

This disclosure claims priority under 35 U.S.C. § 119 to: India Application No. 1148/MUM/2013 filed Mar. 26, 2013. The aforementioned application is incorporated herein by reference in its entirety.

TECHNICAL FIELD

The disclosure generally relates to the field of identification and authentication/verification of a user in financial transactions over electronic devices. More particularly, the disclosure relates to an efficient, single-step method and system for identifying and authenticating/verifying the user by means of a personalized identifier and a biometric sample of the user attached with the personalized identifier.

BACKGROUND

The proliferation of information technology and e-commerce has significantly made dramatic changes in the processing, management and execution of various activities in different sectors including automotive, pharmaceutical, communication, retail and finance etc. The process of executing commercial transactions electronically with the help of the leading technologies such as Electronic Data Interchange (EDI) and Electronic Fund Transfer (EFT) has enabled new opportunity for users to exchange business information and perform business transactions through electronic means. There are multiple communication channels which are being used to exchange business information such as Internet, IVR Systems, ATM, and POS systems etc. The internet has become one of the vital communication channels to facilitate such automation in these diversified sectors. One of the sectors that have been predominantly using the internet as a primary source for most of the transaction processing is the financial/banking sector. The internet means enables the banking consumers to access their account even from remote electronic devices via banking servers in order to perform several monetary transactions, generally known as online/net-banking transactions. However, in order to facilitate secured transactions over online means, several security authentication standards are implemented on the banking systems so that intruder attacks on the consumer accounts can be avoided. However, the existing systems of uniquely identifying the authorized consumer on the banking servers are cumbersome as the identifiers identifying the consumers are not personalized.

Most banking systems follow either an online/offline account opening procedure detailing the customer identifying information which includes personal profile details including Name, Date of Birth, Residential Address, Identification Number, Photograph, and Signature etc. Banks need not establish the accuracy of every element of the identifying information acquired from the customer, however the banks must compulsory verify enough information to form a reasonable belief that the true identity of the customer is captured and validated. Banks also verify all the applicable and acceptable documentary proofs provided by the customer while opening the account with the bank. Once the customer gets verified, the bank issues a 14-16 digits long unique bank account number to the customer. This Bank Account number is a 14-16 digit alphanumeric string which is generated based on the internal banking process which may be uniquely implemented differentially by each of the banks. These bank account numbers are generated randomly with a sequential logic normally incremented with the addition of each new consumer to the bank. For example, if the latest addition to the bank consumer data is assigned a bank account number as AAA123456, the internally programmed implements a random algorithms that will assign an account number AAA123457 to the subsequent consumer subscribing with the bank. However, this implementation logic may vary from bank-to-bank and hence an individual consumer having three different bank accounts may have three different variable length (practically 14-16 digits long) distinct bank account identifiers.

Traditionally, identification and authentication is carried out using two separate data elements, one element being used for identification (username, account ID and email address etc.) and the second data element (password, PIN, biometric sample etc.) is used for authentication which is a secret or personalized element. The user provides these data elements as two separate entities.

Many banking systems provide a facility to customers for creating online account names (login IDs) or account aliases but these have limitations, wherein the customer has to choose a name complying with the specified rules and also it needs to be unique across the whole system. Likewise, even other channels of remote banking such as mobile banking also demand account number and other details such as credit/debit card number on IVR and other interactive channels which are generally tough to memorize. At the same time each user needs to remember multiple account details (identifier, pin, password etc.) for different online accounts for accessing via different channels including mobile, IVR, ATMs, and POS etc.

Biometric authentication has been implemented for user authentication and thereby granting access to the authenticated users after successful validation. In these systems, generally, a biometric sample such as voice, fingerprint and eye retina etc. is captured from each user and stored as a golden copy in a database. This golden copy of biometric sample is associated with the user's account number and mapped at the time of authentication.

The algorithms used in the existing biometric authentication techniques rely on generating a confidence score that signifies the probability of a match. According to the traditional biometric authentication technique, the user asking for validation on the biometric machine is considered to be genuine and authorized user when the matching score for the corresponding user is above a pre-defined threshold score. Thus, there is a high probability of two or more consumers getting a high enough confidence score.

These kinds of one step biometric authentication are implemented on comparatively smaller systems such as door locking and desktop login wherein only a biometric sample is captured and directly compared with the previously stored templates for user authentication. Such mechanism of template matching is time consuming and generally takes considerably large processing time varying between 100-1000 times than the text matching processes and also the probability of false matching is very low in case of a small database (small set of consumers). Such type of biometric authentication therefore increases the false match probability as well as the turn-around time to complete the entire database scan.

Current biometric authentication systems utilize a single generic algorithm and model for every individual. For example if a right user is negatively identified by the system then there is no provision in the system to receive this feedback and improve itself to identify this user correctly in future attempts. At present, the current false acceptance rate (FAR) for voice and Handwriting biometric is 0.02% while for hand and finger it is 0.002% as proven by the industry.

This one-step biometric authentication technique, if implemented for identification and authentication of bank consumers having personalized non-unique account identifiers, may often result in multiple matches (ambiguous result) and also take a very long time.

SUMMARY

Before the present systems and methods, enablement are described, it is to be understood that this application is not limited to the particular apparatus, systems, and methodologies described herein, as there can be multiple possible embodiments which are not expressly illustrated in the present disclosures. It is also to be understood that the terminology used in the description is for the purpose of describing the particular versions or embodiments only, and is not intended to limit the scope of the present application.

One embodiment of the present disclosure discloses an efficient method and system for identification and authentication of a user by means of at least one personalized identifier. The authentication process may be bifurcated into two steps, the user registration and the user identification along with the user authentication. In the first step i.e. the user registration step, a record corresponding to the user may be created in a stored records contained in a repository. Each record from the stored records comprises a text, a golden copy of biometric templates and a model associated with the golden copy of biometric templates, wherein the each record may be related to the at least one personalized identifier. A privilege level may be assigned to the personalized identifier in the each record of the stored records. The golden copy implies a record that represents the highest quality information, on which any application can depend. The golden copy comprises all records from across the enterprise in this perfect data set.

In the next step, i.e. the user identification and authentication step, a biometric sample corresponding to the at least one personalized identifier in the form of voice biometric sample or handwriting biometric sample may be captured from the user. Speech-to-text conversion or an Optical Character Recognition (OCR) technique may be applied to identify the biometric sample captured from the user and accordingly one or more text-scripts are generated. Further, the biometric sample may be processed to generate a biometric template. In the next step, a set of records may be retrieved from the stored records by matching the one or more text-scripts with the text stored in each record of the stored records. Accordingly, a model set associated with each record from the set of records may be identified. The model set comprises of one or more models associated with each record of set of records. Subsequently, biometric authentication may be applied on the identified set of records by comparing a biometric template corresponding to the biometric sample with the one or more models from the model set corresponding to each record of the set of records to generate a matching score. The matching score may be generated for each model in the model set. As a result of the comparison, when a single record having a matching score greater than or equal to a predetermined threshold score may be identified, then the user may be uniquely identified and may be provided a privileged access based on the assigned privilege level. The system may provide an indication identifying the user In case if the system is not able to uniquely identify the user and more than one records are identified having the matching score greater than or equal to the predetermined threshold score, then the system initiates a real-time authentication of the user. In the real-time authentication, the user may be prompted to provide a real-time biometric sample corresponding to a randomly generated text. The system performs a one-to-one dynamic biometric authentication by comparing a biometric template corresponding to the real-time biometric sample with the models from the model set having the matching score greater than or equal to the predetermined threshold score to uniquely identify the user. In this scenario, the models from the model set having the matching score greater than or equal to the predetermined threshold score may be re-calibrated using the biometric template corresponding to the real-time captured biometric sample.

In another implementation, a non-transitory computer-readable medium storing computer-executable user-personalized identifying and authenticating instructions is disclosed. The instructions comprises instructions for: capturing at least one personalized identifier as a biometric sample; converting the at least one biometric sample into one or more text-scripts; retrieving a set of records, each record comprising a text, a golden copy of biometric templates, and a model associated with the golden copy of biometric templates, by matching the one or more text-scripts with the text in each record; identifying a model set comprising one or more models associated with the records; comparing a biometric template corresponding to the biometric sample with the golden copy of biometric templates of the records to generate a matching score for each model in the model set; determining that a model in the model set has matching score greater than or equal to a pre-defined threshold score; identifying a user uniquely using the model having matching score greater than or equal to the pre-defined threshold; and providing an indication identifying the user. Further, the computer-readable medium comprises instructions for: determining that a number of models in the model set having matching score greater than or equal to the pre-defined threshold score is more than one; prompting the user to provide a real-time biometric sample corresponding to a randomly generated text displayed for the user; comparing a biometric template corresponding to the real-time biometric sample with the golden copy of biometric templates associated with the models from the model set having matching score greater than or equal to the pre-defined threshold score; and re-calibrating the models having matching scores greater than or equal to the pre-defined threshold score using the biometric template corresponding to the real-time captured biometric sample.

BRIEF DESCRIPTION OF DRAWINGS

The foregoing summary, as well as the following detailed description of embodiments, is better understood when read in conjunction with the appended drawings. For the purpose of illustrating the disclosure, there is shown in the present document example constructions of the disclosure. However, the disclosure is not limited to the specific methods and apparatus disclosed in the document and the drawings.

DETAILED DESCRIPTION OF THE DISCLOSURE

Figure 1:
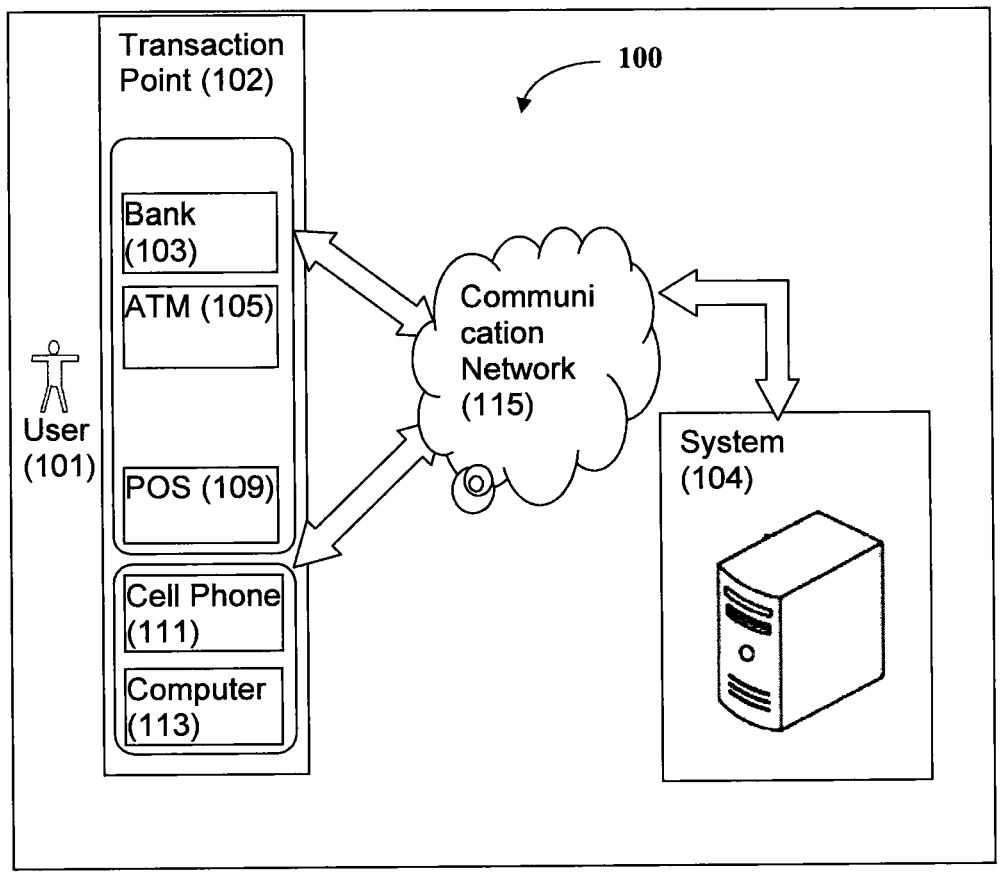
FIG. 1 illustrates a network implementation representing the different blocks involved in the process of biometric identification and authentication of a user performing a financial transaction.

Some embodiments of this disclosure, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present disclosure, the exemplary, systems and methods are now described. The disclosed embodiments are merely exemplary of the disclosure, which may be embodied in various forms.

The description has been presented with reference to an exemplary embodiment of the disclosure. Persons skilled in the art and technology to which this disclosure pertains will appreciate that alterations and changes in the described method and system of operation can be practiced without meaningfully departing from the principle spirit and scope of this disclosure.

According to one embodiment, a bank consumer may personalize and customize a bank account identifier in a manner such that it may be easier to memorize and recall for processing all financial transactions. Once the identifier is obtained, there may be no need to change it or worry about it being unique or it getting compromised (similar to password leaks and a need to regularly change passwords). However, because the number of consumers associated with the bank may be very large, there are high chances that two or more consumers may select the same identifier by means of customizing their identifiers using personal information which may be alike. To address this, the additional validation layer to the primary bank identifier in the form of consumer biometric may be provided.

According to one embodiment of the present disclosure, a system and method for unique identification and authentication of at least one user by virtue of a personalized identifier is disclosed. The personalized identifier may be captured in the form of a biometric sample and may be used to create a record comprising a text, a golden copy of biometric templates and a model associated with the golden copy of biometric templates. The model may be generated based on Metadata extracted from the biometric sample. Accordingly, records comprising records associated with at least one user may be generated and stored in a repository, hereinafter referred to as "stored records". Each of the personalized identifiers may be further assigned with a privilege level based on a plurality of attributes.

In one embodiment, the repository containing the stored records may be used by a system in order to correctly identify and authenticate the at least one user based upon the personalized identifier. Privileged access may be provided to the user based upon the attributes associated with the personalized identifier.

In one embodiment of the present system, at the time of registration, at least one personalized identifier in the form of voice biometric sample or handwriting biometric sample may be captured from the at least one user. The voice biometric sample or the handwriting biometric sample may be extrapolated to generate the golden copy of biometric templates. Speech-to-text conversion or an OCR technique may be applied on the voice biometric sample or handwriting biometric sample and accordingly the text and the model may be generated for the personalized identifier. This model associated with the golden copy of biometric templates may be generated using metadata extracted from the golden copy of biometric templates. The Metadata herein refers to behavioral data corresponding to the voice biometric sample and the handwriting sample like pauses, overlapping speech, stutter, voice sample, fluctuations in voice, disability in the thoracic cavity which impairs normal voice characteristics, the image of the handwritten text, writing speed, pressure, gap between words and characters, signature, and the like which are associated with the golden copy of the at least one user.

In one embodiment, the text associated with the personalized identifier may be passed to the system to search for duplicate records. The system may utilize text searching algorithms and fuzzy searching algorithms for text comparison and machine learning algorithms to lookup previously stored records and models from the repository. The record searched along with the respective model may be forwarded to a user registration module which applies machine learning algorithms to identify a model set in which the user's record needs to be included. The user registration module updates the repository with the user's record in the stored records and corresponding model in the respective model set. If the search does not return any duplicate records, the user registration module utilizes the generic/universal model and registers the user in the repository. In a similar manner the stored records are generated by accepting personalized identifiers from a plurality of users.

The repository may be also configured to store the privilege level along with the personalized identifier, wherein the privilege level may be assigned based on one or more attributes associated with the personalized identifier. In an embodiment, the attributes include beneficiary type (Nature of acquaintance—Family, Friend etc), age group, transaction location (Postal Area), transaction category/purpose (Entertainment, Sports, Educational, Insurance, and Loan etc), associated transaction limit (in amount/currency), type of network (Electronic/Online, Retail Outlet etc), transaction validity duration (day(s)/time), number of transactions and combinations thereof. In an exemplary embodiment, one of the privilege level associated with the attributes may allow to perform the transactions through Point of Sale (POS) terminals and not from the mobiles devices. Similarly, in another exemplary embodiment, the privilege level may allow to perform the transactions only through the registered electronic devices.

Based on these attributes, the user can define rules and the privilege level such as view details, conduct a monetary transaction, conduct monetary transaction up-to a limit, conduct non-financial transactions except address change etc. The user can set rule for the usage of the personalized identifier to specify authentication rights such as limited access, full transaction access and location specific access such as shopping malls based upon the scope of transaction. The personalized identifier has a validity period (with expiry date/time) or usage attempts (One time usage or multiple) associated to the privilege level.

In one embodiment, once the rule and its associated privilege level are set by the user, he/she can now add his/her one or more beneficiaries selected from a group comprising family, friends, colleagues, subordinates and combinations thereof. The beneficiaries are enrolled in the system by the user using beneficiary's personalized identifiers (called account alias) and this alias may be tagged to the user's personalized identifier using an assignment module. This alias could be the same as the user's personalized identifier or a different identifier. This alias will be treated as the identifier for the beneficiary but can only be chargeable against the user's account. For instance, the user can award "limited" privileges to his/her 12 year old child for using 'child personalized identifier' tagged to his/her account. The privileges awarded can be utilized for payments at the gaming station at a designated location for a designated transaction limit on weekends only. Rules of this nature can be setup and personalized using this disclosure.

In one embodiment of the present disclosure, a voice biometric sample may be captured from the user at the time of identification/authentication and a voice biometric sample may be generated thereof. Speech-to-text conversion technique may be applied on to the captured voice biometric sample in order to generate a text-script. This text-script may be compared with the text corresponding to each personalized identifier stored in the repository. The text-script may be compared by utilizing the generic text searching and fuzzy searching algorithms and accordingly a set of records are fetched from the stored records. The set of records may be indicative of a plurality of records with the same personalized identifier. During Authentication, the model associated with each of the set of records may be compared with the biometric template of the voice biometric sample captured from the user and privileged access may be provided to the user based upon the comparison result. The system may provide an indication identifying the user. The privilege level of the user may be determined by the personalized identifier uttered by the user at the time of registration and the attributes associated with the personalized identifier.

In one embodiment of the present disclosure, the personalized identifier may be captured in the form of handwriting biometric sample using image capturing unit or biometric handwriting capturing hardware from the user at the time of identification and authentication and a handwriting biometric template may be generated thereof. An Optical Character Recognition (OCR) technique may be applied on to the captured personalized identifier in order to generate a text-script. This text-script may be compared with the text associated with each of the personalized identifiers from the stored records contained in the repository and accordingly a set of records are fetched from the stored records. The model of the set of records may be compared with the handwriting biometric template associated with the handwriting biometric sample captured from the user using machine learning techniques and privileged access may be provided to the user based upon the comparison result.

In one embodiment of the present disclosure, during identification, the system of the present disclosure will find out the best applicable model from the model set associated with the set of records based on received input from the user. These techniques will extract the features from the user's biometric sample and find out the applicable model in an optimum and secured way. In case the system is not able to find out the model then the system may prompt the user to provide the biometric sample again. In case the system finds multiple models or multiple records, then the system may re-prompt the user to provide some arbitrary verbal input such as prompting the user to read arbitrary text displayed on the screen or answer the puzzle and the like to remove the ambiguity. The banks system will use this user input to train or recalibrate the corresponding model using machine learning techniques and adapt the periodic and online changes of the user's biometrics.

FIG. 1 is a block diagram representing network implementation (100) of biometric authentication system (104) herein after referred to as a system (104) involved in the process of biometric authentication of a user performing a financial transaction. The system (104) may be connected to a Transaction Point (102) at places such as a Bank (103), an ATM (105), a POS (109), a cell phone (111), a computer (113). The coupling between these blocks may be enabled using a communication network (115).

In one embodiment of the present disclosure, a user (101) initiates any of the financial transaction at the transaction Point (102) by entering prerequisites of his financial transaction and personalized identifier at one amongst the systems in the Bank (103), the ATM (105) or the POS (109). The user (101) can also perform online transactions by entering information regarding his financial transactions on the cell phone (111) or the computer (113). This information may be transferred to the system (104) through the communication network (115). The final biometric authentication process may be executed at the system (104) using the identification and authentication information of the user (101) stored in the form of stored records. The detailed working of the system (104) is explained with reference to FIG. 2.

Figure 2:
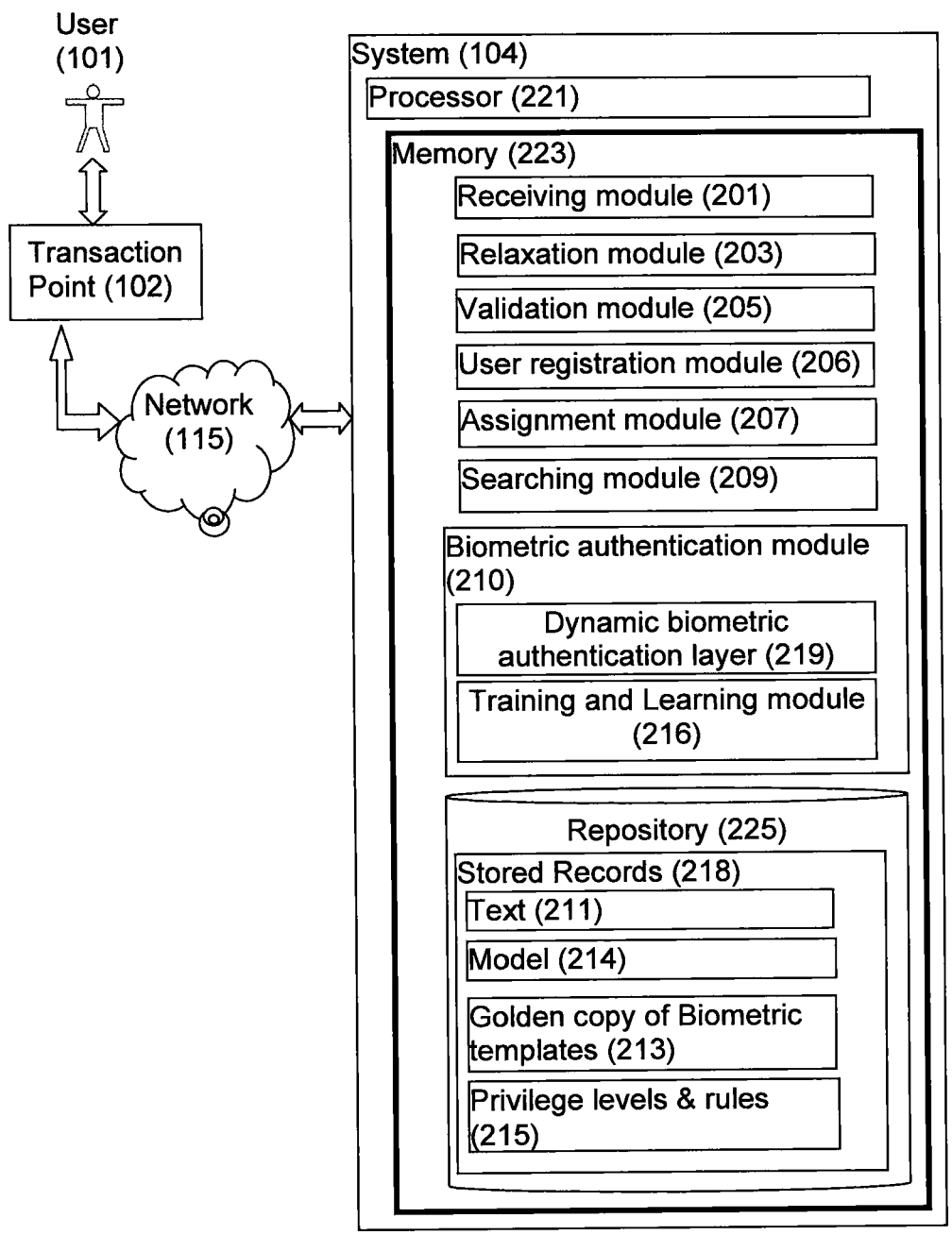
FIG. 2 illustrates a detailed block diagram representing different modules involved in the process of registration, biometric identification and authentication of the user.

FIG. 2 is a detailed block diagram representing different modules involved in the process of biometric authentication of the user (101) at the system (104). The system (104) comprises of a processor (221) and a memory (223) coupled to the processor (221). The memory (223) further comprises a plurality of modules executable by the processor (221). The modules comprising a receiving module (201), a relaxation module (203), a validation module (205), a User Registration module (206), an assignment module (207), a searching module (209), a biometric authentication module (210) and a repository (225). The biometric authentication module (210) further comprises of Training and Learning module (216), and a dynamic biometric authentication layer (219). The repository (225) contains the stored records (218), wherein each record of the stored records (218) comprises authentication information corresponding to multiple users. The authentication information may be captured at the time of registration.

In one embodiment of the present disclosure, the registration process of the user (101) may be initiated by capturing a personalized identifier in the form of a voice biometric sample or a handwriting biometric sample from the user (101) and personalized information by the receiving module (201). The User Registration module (206) from the system (104) generates a new record in the stored records (218) for the user (101) in the repository (225). The new record generated for the user (101) in the stored records (218) comprises of a text (211), a model (214), a golden copy of biometric templates (213) associated with the user (101) and the user defined Privilege levels & rules (215). The new record may be extracted from the personalized identifier captured in the form of the voice biometric sample or the handwriting biometric sample provided by the user (101) at the time of account registration. Similarly, for different users, different records are generated and stored in the repository (225) in the form of stored records (218). The Validation module (205) ensures the proper conversion of the captured sample personalized identifier into the text (211) based upon a pre-defined set of conversion criteria. The text (211) and associated model (214) with extracted Metadata may be passed to the searching module (209).

The searching module (209) may be configured to search for records having a text similar to the text (211) and respective model set associated therewith in the repository (225) by utilizing the text/fuzzy searching algorithm. The search result may be forwarded to the user registration module (206). The job of the user registration module (206) may be to enroll/register any new user in the system (104). The User Registration module (206) may be configured to identify the appropriate model set in which the new user needs to be registered with the help of machine learning algorithms and to register the user (101) by updating the model set with the model associated with the user (101) in the repository (225). If the searching module (209) is unable to retrieve the respective model set then the user registration module (206) may be enabled to register the user (101) by creating a new model set using universal/generic model. The repository (225) may be also adapted to store the user defined privilege levels & rules (215) associated with each record from the stored records (218). The detailed flow structure involved in the process of generation of the new record and appending it into the stored records (218) at the time of the registration of the user (101) is explained in FIGS. 3A-B.

In one embodiment of the present information, the process of identification and authentication of the user (101) starts at the system (104), wherein all the transaction information captured by the Transaction Point (102) may be sent to the system (104). The receiving module (201) of the system (104) may prompt the user (101) to provide his/her personalized identifier in the form of biometric sample, and may capture the biometric sample using a microphone or a handwriting biometric capturing unit/sensor attached to the transaction point (102). In case if the transaction point (102) is not enabled with the microphone, an IVR call may be initiated on the cell phone (111) of the user (101) in order to capture the voice of the user as the biometric sample, hereinafter referred as the "captured biometric sample". On the other hand if the user (101) enters a handwritten text script, it may be captured through the handwriting biometric capturing unit/sensor attached to the transaction point (102). The handwritten text script captured through the handwriting biometric capturing unit/sensor then act as the handwriting biometric sample of the user (101), hereinafter referred as the "captured biometric sample". The captured biometric sample may be converted into a text-script by the relaxation module (203) and based on the distinctive characteristics; the corresponding Metadata may be generated. In an embodiment, the metadata includes the behavioral data corresponding to the spoken data like pauses, overlapping speech, stutter, environmental conditions like noise, thunder, background audible non speech events like traffic noise, honk, beep, fluctuations in voice, and disability in the thoracic cavity which impairs normal voice characteristics etc. In one embodiment, if the captured biometric sample is handwritten text script, then the metadata includes word spacing, handwriting style, and speed of writing, pressure applied while writing, line spacing and the like.

In one embodiment, the relaxation module (203) comprises of a speech to text conversion unit that may be configured for converting the speech to the corresponding text-string. Relaxation module (203) will not only convert speech to text but also will be used in noise reduction during the capturing of personalized phrase. The relaxation module (203) may be also enabled to convert the non-transcriptable sound speech into a meaningful text. For instance if the user (101) has honk (Emit such a cry or sound) in the personalized phrase then this honk will be converted by the relaxation module (203) into a system readable format. In another embodiment, the relaxation module (203) comprises of an Optical Character Recognition (OCR) unit to convert the handwriting image into text-script. The generated text script may be validated from the user (101) by the validation module (205). This may be done in order to ensure proper conversion of the captured biometric sample into the text-script. In case the relaxation module (203) is not able to convert the speech or the image into the corresponding text-script, then the system (104) prompts the user (101) to re-enter the personalized identifier. The validation module (205) validates the text-script generated and accordingly the validated text-script and the captured biometric sample are then transferred to the searching module (209). The searching module (209) compares the validated text-script with the text (211) associated with the personalized identifier stored in the form of records in the stored records (218) by applying the text/fuzzy matching algorithms to find out the associated records and associated model (214). The results of this will be passed to the biometric authentication module (210) to retrieve a set of records from the stored records (218) using a Machine learning algorithm. Accordingly, the model set associated with the set of records are extracted based upon the matching result. In the next step, the biometric authentication module (210) validates/authenticates the user (101) by comparing a biometric template corresponding to the biometric sample with the model (214) from the model set to generate a matching score with respect to each record of the set of records stored in the repository (225). The system may provide an indication identifying the user. The indication may be in form of at least an audio alert, a visual alert and a combination thereof. There may be a possibility of getting multiple users having higher matching score greater than or equal to the pre-defined threshold score. In this scenario, the biometric authentication module (210) may be configured to uniquely identify the user (101) from the multiple users. In order to enable this, the biometric authentication module (210) may be adapted to receive a real-time biometric sample from the user (101) either in the form of a speech or handwriting signature corresponding to a randomly generated text. The user (101) will then be validated and uniquely re-identified based on the real-time biometric sample. The Metadata corresponding to the real-time biometric sample then act as an input to train and refine the previously stored model (214) of the user (101) so that the system adapts and avoid multiple matches in the future authentications. This input will be used to train the whole system using a self-learning algorithms or machine learning mechanisms implemented by the Training and learning module (216). The Training and learning module (216) may be not only configured for creating model (214) based on Metadata but also re-calibration of the existing model (214)

using machine learning algorithms or artificial intelligence algorithms. The re-calibration of the model (214) from the model set having the matching score greater than or equal to the pre-defined threshold score may be implemented using the biometric template corresponding to the real-time captured biometric sample. The Training and learning module (216) refines the stored model (214) in the repository (225), so that ambiguity in the future authentication using the system (104) may be avoided.

The Training and learning module (216) utilizes the machine learning algorithms or artificial intelligence algorithms known in the art for re-calibrating of the existing model (214). In an artificial intelligence or machine learning system, a training set consists of an input vector and an answer vector, and may be used together with a supervised learning method to train a knowledge database (e.g. a neural net or a naive bayes classifier) by an artificial intelligence (AI) machine.

In an embodiment, the Training and learning module (216) may implement statistical modelling. In statistical modeling, a training set may be used to fit a model that can be used to predict a "response value" from one or more "predictors." The fitting can include both variable selection and parameter estimation. Statistical models used for prediction are often called regression models, of which linear regression and logistic regression are two examples.

In an embodiment, different approaches that can be used in the machine learning techniques includes Decision tree learning, Association rule learning, Artificial neural network, Genetic programming, Inductive logic programming, Support vector machines, Clustering, Bayesian networks, Reinforcement learning, Representation learning, Similarity and metric learning, Sparse Dictionary Learning and combinations thereof.

Figure 3A:
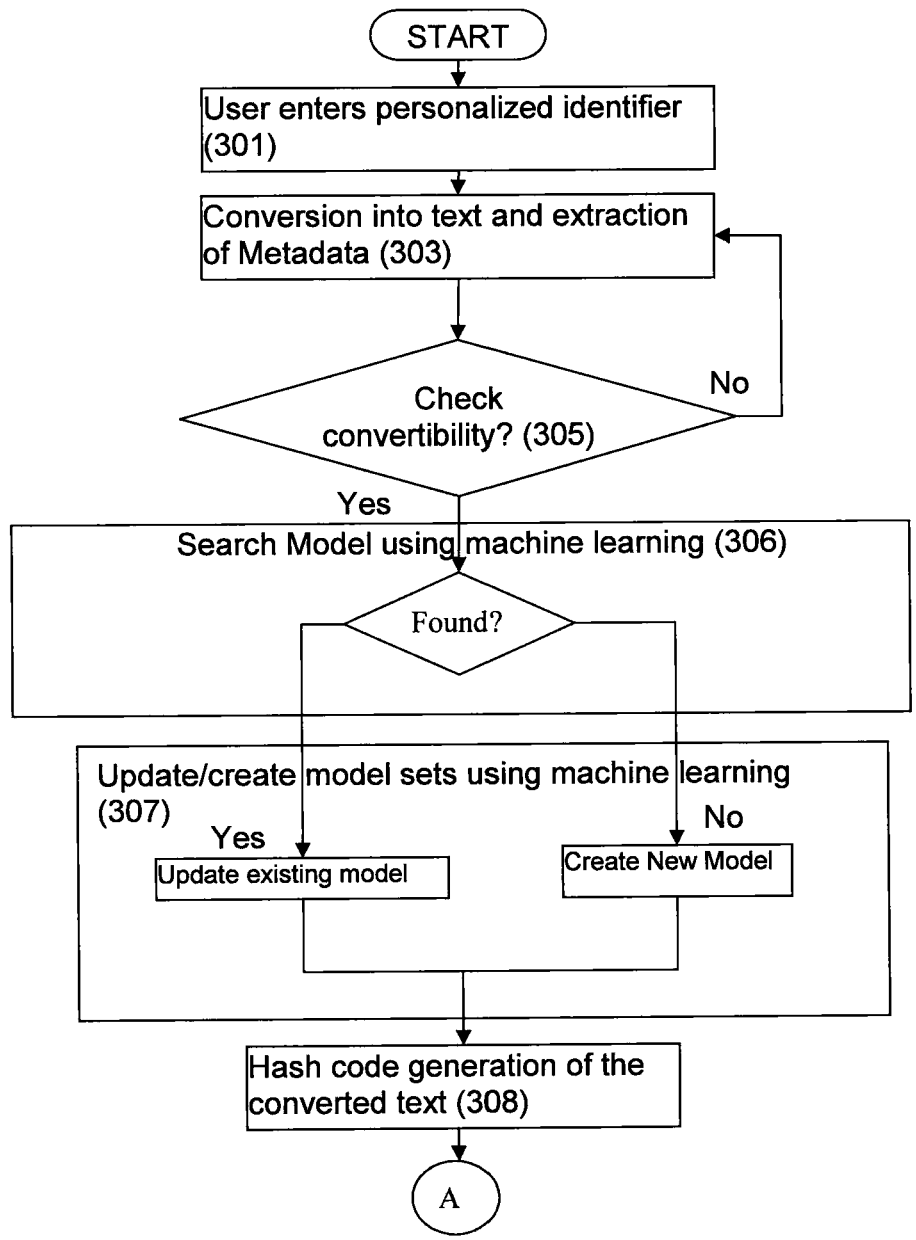
FIGS. 3A-B illustrate a flow diagram representing the process of capturing biometric sample and personalized identifiers, associated Metadata at the time of account registration/enrolment.
Figure 3B:
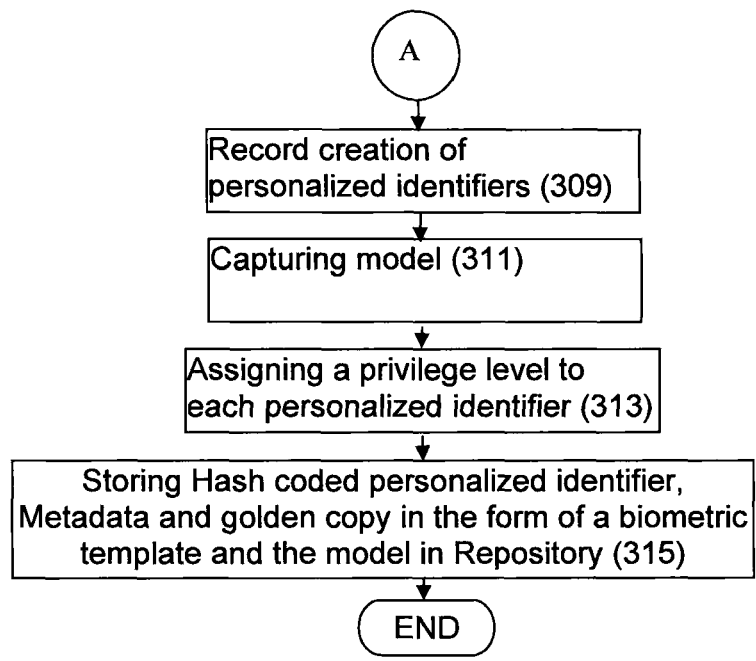

Referring to FIGS. 3A-B, a flow diagram is disclosed illustrating the process of capturing personalized identifiers at the time of account registration in the form of a biometric sample. At step (301) the user (101) enters his/her personalized identifier in the form of a voice or a handwriting image as a biometric sample at the bank (103) using a microphone and a handwriting biometric capturing unit/sensor respectively. The personalized identifier may be captured repetitively to identify and store the variances associated with the biometric sample provided by the user (101) in a model. At step (303) the biometric sample may be converted into text (211) and the associated Metadata may be extracted accordingly. At step (305) a check may be performed to determine a proper conversion of the biometric sample in to the text (211). This may be done in order to ensure smooth conversion of the personalized identifier into the text (211). If there is improper conversion, the personalized identifier from the user (101) may be rejected and the user (101) may be prompted to provide personalized identifier again. Once the personalized identifier is accepted, it may be stored into stored records (218). At the step (306), the searching module (209) determines the existing model sets associated with the stored records (218) in order to find the model set in which the user (101) can be registered. This may be determined using the user's Metadata with the help of training and learning module (216). If the system is able to retrieve the corresponding model set based on the Metadata associated with the biometric sample then the user (101) may be registered in the respective model set else the system will create a new model for the user (101) in the step (307). In step (308) a hash code may be generated for the text (211), in order to convert it into a standard bit size. The hash code equivalent of the personalized identifier may be easy to compare and hence makes the searching faster than text comparison. In a similar manner at step (309) multiple personalized identifiers are accepted and appended to the stored records (218). The text (211), the golden copy of biometric templates (213) associated with the text (211) are captured from the user (101) and stored in as a record at step (309). Following this, at step (311), a model may be captured for the record created at step (309) and appended in the record. At step (313) a privilege level may be assigned by the assignment module (207) to each record based upon the attributes specified by the user (101). In this embodiment, the text (211) in a single record can be associated with a plurality of users sharing the same account and different biometric templates associated with the plurality of users are captured from each of the users separately for authentication purpose and privilege level are assigned for each personalized identifier. The biometric sample in the form of text (211) and the associated model (214) comprising golden copy of biometric templates (213) may be stored in the repository (225) in the form of a single record in step (315) for each user (101).

Figure 4A:
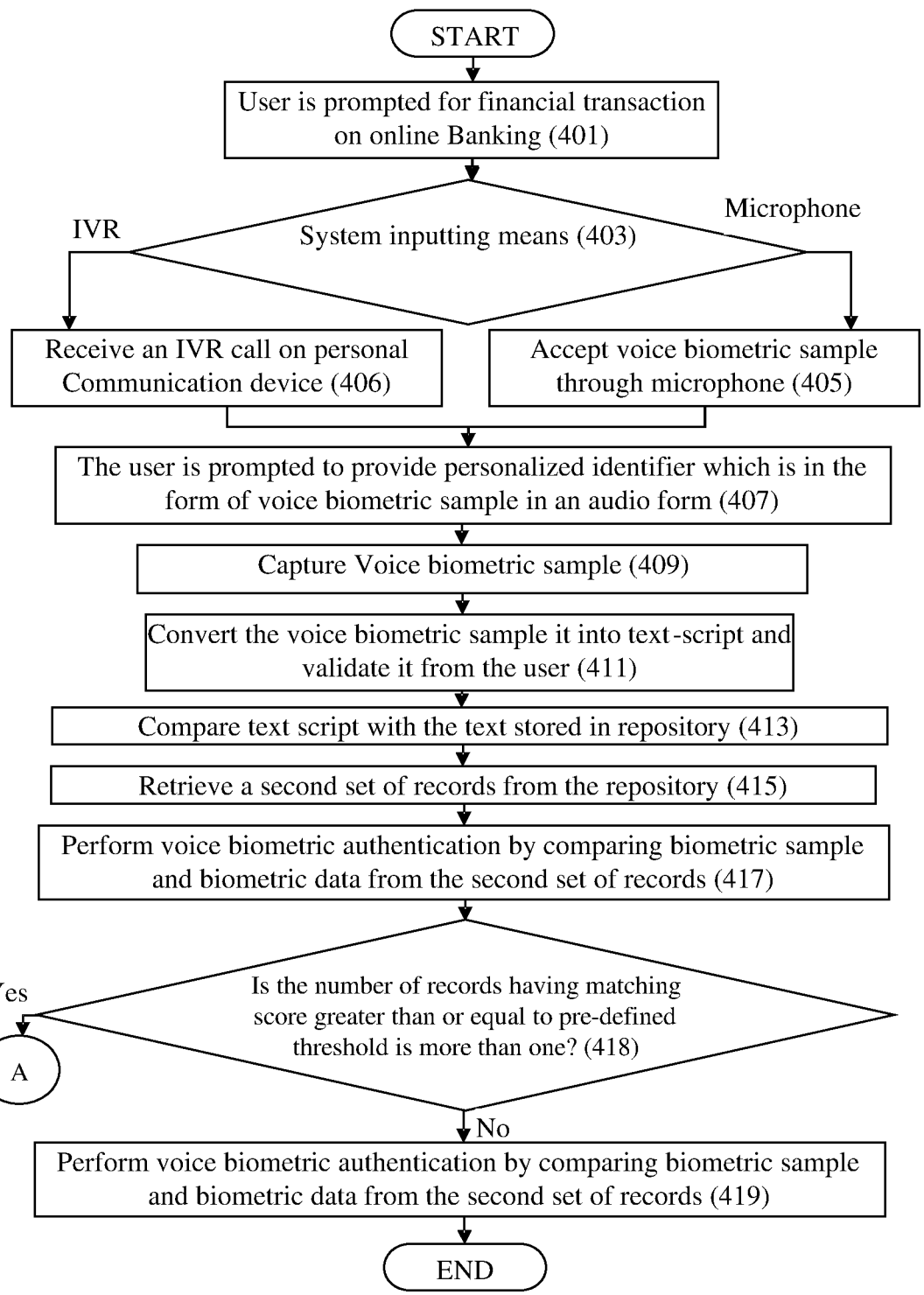
FIGS. 4A-B illustrate a flow diagram of a voice-based biometric authentication process using the personalized identifier.
Figure 4B:
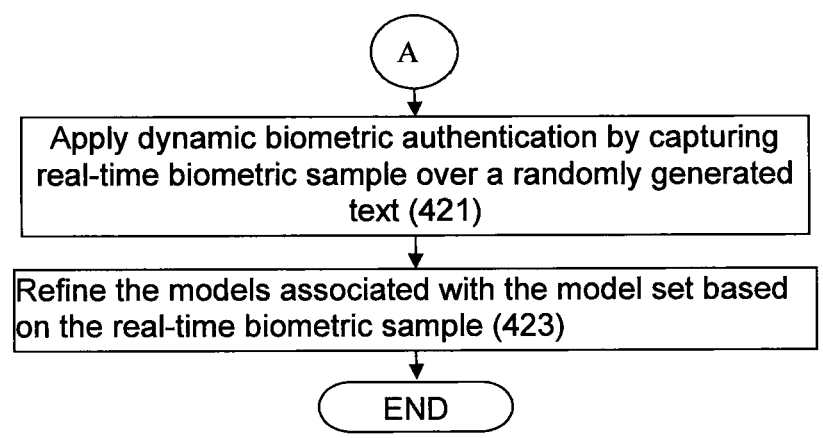

FIGS. 4A-B depict a flow diagram illustrating the voice biometric authentication process using the personalized identifier in accordance with one embodiment of the disclosure. The user may be prompted for making financial transaction using online banking at step (401). At step (403) the system checks the receiving means for capturing the voice biometric sample. At step (405) the system may be checked for presence of a microphone in order to capture voice biometric sample of the user. In case if the system is not enabled with a microphone, an IVR call may be triggered on the personal communication device of the customer at step (406) in order to capture his voice biometric sample. At step (407) the user may be prompted to provide his/her personalized identifier which may be in the form of voice biometric sample in an audio form. At step (409) the voice biometric sample may be captured from the user either by using the IVR facility or the microphone attached to the system. This voice biometric sample captured from the user may be converted in to a text-script using the speech-to-text conversion and the user input may be accepted regarding the correct generation of the text-script at step (411). At steps (413) and (415), the text-script may be compared with the text (211) stored in the repository (225) associated with the stored records (218) and based upon the result of comparison a set of records are retrieved from the repository (225). At step (417), voice biometric matching may be performed by comparing the voice biometric sample captured from the user with one or more models from the model set corresponding to each record of the set of records to generate a matching score. At step (418), the matching scores are compared with a pre-defined threshold. If a single user is identified with the matching score greater than the pre-defined threshold then this user may be identified as the account holder and hence a privilege access may be granted to the identified user corresponding to the privilege level assigned to the personalized identifier for the identified record at step (419). The system may provide an indication identifying the user. The indication may be in form of at least an audio alert, a visual alert and a combination thereof.

In another embodiment, if a plurality of users are found at step (418) having matching score greater than the pre-defined threshold then the dynamic biometric authentication layer (219) initiates an additional authentication step in the form of a dynamic voice biometric authentication at step (421). In step (421), the dynamic voice biometric authentication may be applied by capturing real-time voice biometric sample corresponding to a randomly generated text. A biometric template associated with the real-time voice biometric sample may be used for the dynamic authentication. At this step the biometric template associated with the real-time voice biometric sample may be mapped with the models from the model set having the matching score greater than or equal to a pre-defined threshold score and accordingly the user may be granted access if the authentication information is valid. At step (423) the models from the model set having the matching score greater than or equal to a pre-defined threshold score are re-calibrated using the real-time captured voice biometric sample to avoid further conflicts at the authentication step.

Figure 5A:
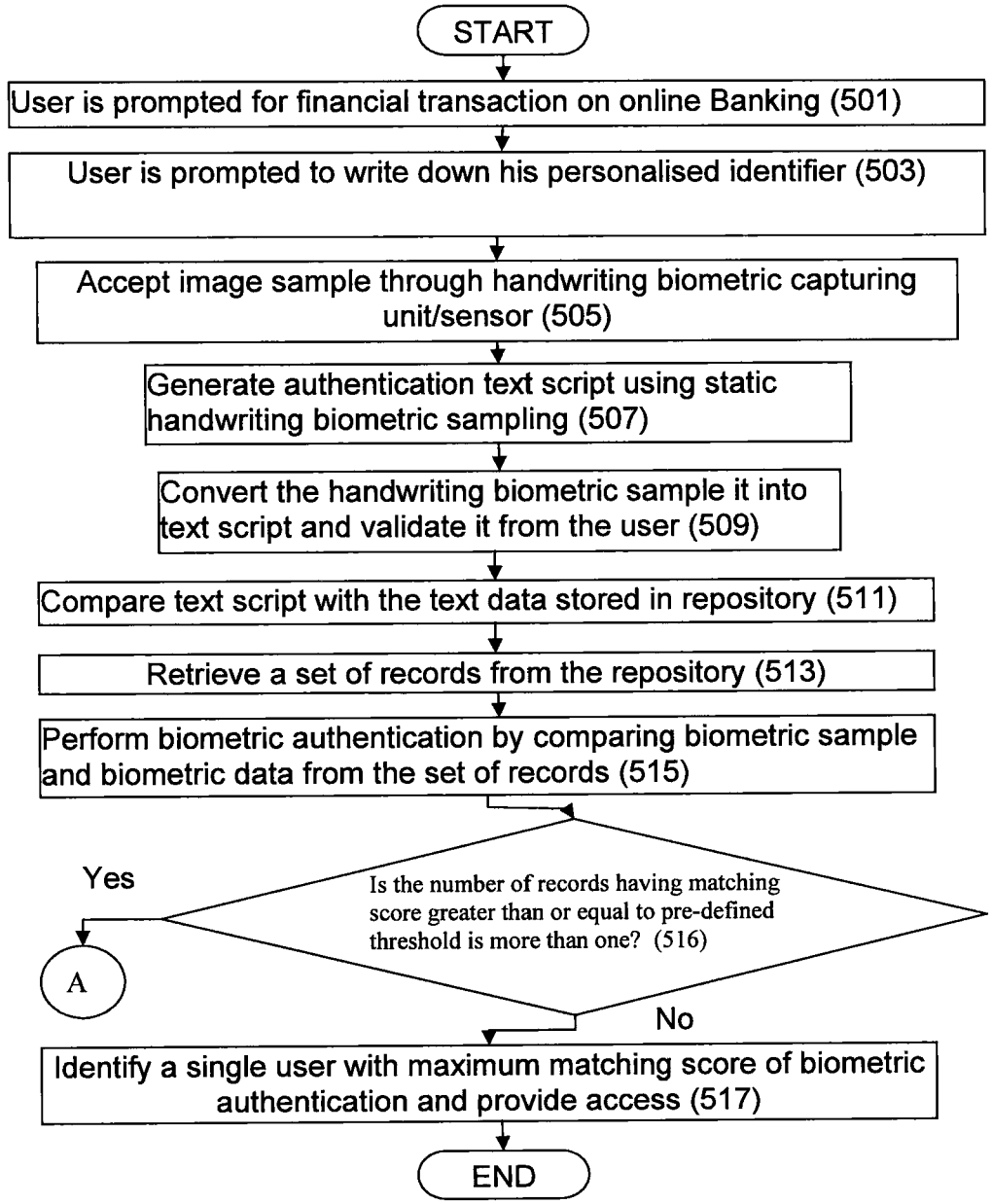
FIGS. 5A-B illustrate a flow diagram of a handwritten-based biometric authentication process using the personalized identifier.
Figure 5B:
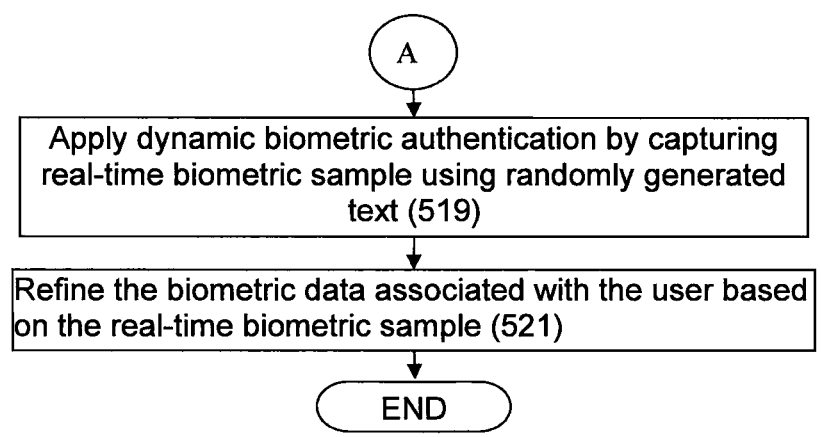

FIGS. 5A-B depict a flow diagram illustrating the handwriting biometric authentication process using the personalized identifier in accordance with one embodiment of the disclosure. The user may be prompted for making financial transaction using online banking at step (501). At step (503) the system prompts the user to write his/her personalized identifier under the handwriting biometric capturing unit/sensor. At step (505) the handwriting biometric capturing unit/sensor captures the personalized identifier as a handwriting biometric sample. At steps (507) and (509) an authentication text-script may be generated using static handwriting biometric sampling by converting the captured handwriting biometric sample into the text script which may be validated from the user. At step (511) the text-script may be compared with the text (211) stored in the repository (225), and a set of records may be retrieved from the stored records (218) at step (513). At step (515) for each model in the model set associated with the set of records, the biometric template corresponding to the handwriting biometric sample may be compared with the one or more models from the model set to generate a matching score corresponding to each record from the set of records. At step (516) the matching score generated at step (515) may be compared with a pre-defined threshold. If a single user is identified with a matching score greater than the pre-defined threshold then this user may be identified as the account holder and a privilege access may be granted to the identified user corresponding to the privilege level assigned to the personalized identifier for the identified record at step (517). The system may provide an indication identifying the user. The indication may be in form of at least an audio alert, a visual alert and a combination thereof.

In another embodiment, if multiple users are identified having matching score greater than the pre-defined threshold then the dynamic biometric authentication layer (219) initiates an additional authentication step in the form of a dynamic handwriting biometric authentication at step (519). In the step (519), the dynamic handwriting biometric authentication is applied by capturing real-time handwriting biometric sample corresponding to a randomly generated text from the user. A biometric template associated with the real-time handwriting biometric sample is compared with the models from the model set having the matching score greater than or equal to a pre-defined threshold score and accordingly a single user is identified from the dynamic authentication process at step (519). At step (521) the models from the model set having the matching score greater than or equal to a pre-defined threshold score are re-calibrated using real-time captured handwriting biometric sample to avoid further conflicts at the authentication step.

Some embodiments of the present disclosure provide, inter alia, example, non-limiting advantages, including:

1. removing the need to use authentication credentials such as passwords, pins, security questions and the like as well as the need to periodically change them, without compromising the security of the system;

2. facilitating a consumer to choose his own personalized account number/identifier and store it in the same form without requiring the customer to choose a unique identifier;

3. enabling selection of account identifier of variable length that can contain alphanumeric characters which can be written and/or spoken by a human and captured by a computer;

4. enabling consumers to use a single account identifier at all channels for performing all kinds of transactions without privacy/security concerns;

5. enabling capturing the consumer's voice or handwriting biometric sample which is used for identification as well as authentication while carrying out any kind of transaction; and 6. enabling the account identifier that is easy to recall that helps in consumer satisfaction.

The specification has described methods and systems for validating personalized account identifiers using biometric authentication and self-learning algorithms. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

We claim:

1. A computer implemented method for identifying and authenticating at least one user by means of at least one personalized identifier, the method comprising:

storing, by a processor, a first set of records associated with the at least one user, each record comprising a text, a golden copy of biometric templates and a model associated with the golden copy of biometric templates, wherein the text, the golden copy of biometric templates and the model are associated with the at least one personalized identifier;

assigning, by the processor, at least one privilege level to the at least one personalized identifier in each record of the first set of records based on one or more attributes;

capturing, by the processor, the at least one personalized identifier in the form of a first real time biometric sample wherein the first real time biometric sample is in the form of speech or a handwriting signature;

converting, by the processor, the first real time biometric sample into one or more text-scripts;

retrieving, by the processor, a second set of records from the first set of records, by matching the one or more text-scripts with the stored text in each record of the first set of records and accordingly identify a model set comprising one or more models associated with each record from the first set of records and the second set of records;

comparing, by the processor, a biometric template corresponding to the biometric sample with the golden copy of biometric templates of each of the records from the second set of records to generate a matching score, wherein the matching score is generated for each model in the model set;

identifying, by the processor the at least one user uniquely from the model set having the matching score greater than or equal to a pre-defined threshold, when the number of models in the model set having the matching score greater than or equal to a pre-defined threshold score is more than one;

prompting, by the processor, the at least one user to provide a second real time biometric sample corresponding to a randomly generated text displayed to the at least one user, wherein the second real time biometric sample is in the form of a speech or a handwriting signature;

comparing, by the processor, a biometric template corresponding to the second real time biometric sample with the golden copy of biometric templates associated with the models from the model set, having the matching score greater than or equal to a pre-defined threshold score to uniquely identify the at least one user;

re-calibrating, by the processor, the model set having the matching score greater than or equal to a pre-defined threshold score using the biometric template corresponding to the second real-time captured biometric sample, wherein the model set is being created and recalibrated using at least one machine learning technique selected from a group comprising at least one of a decision tree learning, an association tree learning, and an Artificial neural network based on the second set of records; and generating, by the processor, a user dependent model using the at least one machine learning technique and metadata of the at least one user, wherein the metadata is used for identification of the at least one user from a set of users.

2. The method of claim 1, further comprising:

determining that a number of models in the model set having matching score greater than or equal to the pre-defined threshold score is more than one;

prompting, by the processor, the user to provide a real-time biometric sample corresponding to a randomly generated text displayed for the user;

comparing, by the processor, a biometric template corresponding to the real-time biometric sample with the golden copy of biometric templates associated with the models from the model set having matching score greater than or equal to the pre-defined threshold score; and re-calibrating, by the processor, the models having matching scores greater than or equal to the pre-defined threshold score using the biometric template corresponding to the real-time captured biometric sample.

3. The method of claim 1, wherein the at least one personalized identifier is a variable length data selected from a group comprising a numeric data, an alphabetic data and combinations thereof.

4. The method of claim 3, wherein the at least one personalized identifier is capable of being either written or spoken, and capable of being transformed from either image to text or speech to text, respectively.

5. The method of claim 1, wherein the captured personalized identifier is converted into the one or more text-scripts using speech-to-text conversion or Optical Character Recognition (OCR) techniques.

6. The method of claim 1, wherein the text is converted into a hash-code or Unicode data format of standard data size.

7. The method of claim 1, wherein the at least one personalized identifier is captured in the form of a non-transcriptable sounds, and is correlated with stored text after removing and suppressing the non-transcriptable sounds.

8. The method of claim 1, wherein the matching of the one or more text-scripts with the text is performed using at least one algorithm selected from a group comprising: a semantic string matching, an approximate string matching, a fuzzy string matching, and combinations thereof.

9. The method of claim 2, wherein the model set is being created and recalibrated using at least one machine learning algorithm selected from a group comprising: a Decision tree learning, an Association rule learning, an Artificial neural network, Genetic programming, Inductive logic programming, Support vector machines, Clustering, Bayesian networks, Reinforcement learning, Representation learning, Similarity and metric learning, Sparse Dictionary Learning, and combinations thereof.

10. The method of claim 2, wherein the model is created and re-calibrated utilizing metadata extracted from the real-time biometric sample and the golden copy of biometric templates.

11. The method of claim 1, wherein the one or more attributes are selected from a group comprising transaction location, transaction purpose, transaction limit, network type, duration of transaction, and combinations thereof.

12. A computer implemented system for identifying and authenticating at least one user by means of at least one personalized identifier, the system, comprising:

a processor; and a memory coupled to the processor, wherein the processor is configured to:

store, a first set of records associated with the at least one user, each record comprising a text, a golden copy of biometric templates and a model associated with the golden copy of biometric templates, wherein the text, the golden copy of biometric templates and the model are associated with the at least one personalized identifier;

assign, at least one privilege level to the at least one personalized identifier in the each record of the first set of records based on one or more attributes;

capture the at least one personalized identifier in the form of a first real time biometric sample, wherein the first real time biometric sample is in the form of speech or a handwriting signature;

convert the first real time biometric sample into one or more text-scripts;

retrieve a second set of records from the first set of records, by matching the one or more text-scripts with the text in each record of the first set of records and accordingly identify a model set comprising one or more models associated with each record from the first set of records and the second set of records;

compare a biometric template corresponding to the biometric sample with the golden copy of biometric templates of each of the records from the second set of records to generate a matching score, wherein the matching score is generated for each model in the model set;

identify the at least one user uniquely using the model from the model set having the matching score greater than or equal to a pre-defined threshold, when the number of models in the model set having the matching score greater than or equal to a pre-defined threshold score is more than one;

prompt, the at least one user to provide a second real time biometric sample corresponding to a randomly generated text displayed to the at least one user, wherein the second real time biometric sample is in the form of a speech or a handwriting signature;

compare a biometric template corresponding to the second real-time biometric sample with the golden copy of biometric templates associated with the models from the model set, having the matching score greater than or equal to a pre-defined threshold score to uniquely identify the at least one user;

re-calibrate the model set having the matching score greater than or equal to a predefined threshold score using the biometric template corresponding to the second real-time captured biometric sample, wherein the model set is being created and re-calibrated using at least one machine learning technique selected from a group comprising at least one of a decision tree learning, an association tree learning, and an Artificial neural network based on the second set of records; and generate a user dependent model using the at least machine learning technique and metadata of the at least one user, wherein the metadata is used for identification of the at least one user from a set of users.

13. The system of claim 12, the instructions further comprising instructions for:

determining that a number of models in the model set having matching score greater than or equal to the pre-defined threshold score is more than one;

prompting the user to provide a real-time biometric sample corresponding to a randomly generated text displayed for the user;

comparing a biometric template corresponding to the real-time biometric sample with the golden copy of biometric templates associated with the models from the model set having matching score greater than or equal to the pre-defined threshold score; and re-calibrating the models having matching score greater than or equal to the predefined threshold score using the biometric template corresponding to the real-time captured biometric sample.

14. The system of claim 12, wherein the text-scripts are converted to text wherein the text-scripts to text conversion comprises: speech-to-text conversion or optical character recognition (OCR) for converting speech-to-text, image-to-text and handwriting-to-text respectively.

15. The system of claim 13, the instructions further comprising instructions for: assigning, by the processor, at least one privilege level to the at least one personalized identifier in each record.

* * * * *